3,715,309
PROCESS FOR DETOXICATING WASTE WATERS CHARGED WITH ORGANIC CYANIDE IMPURITIES
Jean-Pierre Zumbrunn, Lyon, France, assignor to L'Air Liquide, Societe Anonyme pour l'Etude et l'Exploitation des Procedes Georges Claude, Paris, France
No Drawing. Filed Sept. 17, 1970, Ser. No. 73,227
Claims priority, application France, Jan. 29, 1970, 7003085
Int. Cl. C02b 1/34
U.S. Cl. 210—63   13 Claims

ABSTRACT OF THE DISCLOSURE

A process for detoxicating waste waters which contain organic cyanide impurities, particularly nitriles consists in rapid degradation of the nitriles into amides and then into salts of organic acids by treatment with hydrogen peroxide in alkali medium, and the per compounds.

This process, which has the advantage of saturating the effluents with oxygen, permits the total purification to a residual content lower than 0.5 p.p.m. of any effluent coming from chemical synthesis plants, such as the factories for the production of plastic materials or synthetic fibers, and containing organic nitriles.

---

The present invention relates to a novel process for purifying waste waters which contain organic cyanide impurities, especially nitriles.

Such effluents are found in the discharge from chemical synthesis plants, such as the factories where certain plastic materials or synthetic fibres are manufactured, which discharge waters containing organic nitriles. Among these nitriles, the main pollution agent is acrylonitrile.

The conventional processes for the purification of effluents of this operate particularly by a hydrolysis of the nitrile into amide and into acid by heating at a temperature close to boiling point. In numerous cases, the hydrolysis is accompanied by a more or less intense volatilisation of the acrylonitrile, which is found in the atmosphere.

Such a process has disadvantages. A complete detoxication necessitates a long treatment time and consequently a considerable consumption of thermal units for heating all the waste waters to a temperature close to boiling point. Furthermore, the known process causes the secondary pollution of the atmosphere.

A process has been found according to the invention which in future makes possible the complete purification, that is to say, to a residual content smaller than 0.5 p.p.m., of any effluent which contains organic impurities and particularly nitriles, such as: acrylonitrile, oxodipropionitrile, propionitrile, acetonitrile, benzonitrile, etc., in a few minutes or in several tens of minutes, depending on the polluting substance and the treatment temperature. In addition, the new process has the advantage of saturating the treated waters with oxygen.

The research carried out for improving the purification of this type of effluent has unexpectedly led the applicants to the novel application of the hydrolysis reaction of organic nitriles into amide by the action of hydrogen peroxide in alkali medium, according to the reactions:

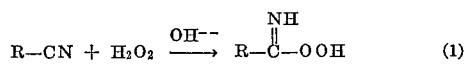

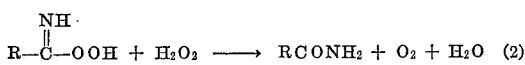

that is to say, summarily:

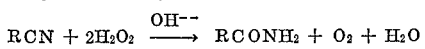

The amide thus forced in hydrolysed in alkali medium into $NH_3$ and $RCOO$, which are much less toxic than the initial nitrile.

The application of these reactions to the treatment of waste waters can only be carried out satisfactorily under specific conditions discovered by the applicants.

The novel process for detoxicating waste waters charged with organic cyanide impurities, particularly nitriles, is characterised in that there is effected a ripid degradation of the said organic cyanide impurities into amides and then into organic acid salts by treatment with a peroxide compound in alkali medium.

According to one method of carrying out the process of the invention, hydrogen peroxide is one of the peroxide compounds chosen for the detoxication.

A source of hydrogen peroxide, it is possible to employ the usual commercial aqueous solutions, or one of its addition derivatives, such as alkali metal perborate or percarbonate, for example, sodium perborate or percarbonate, which has the advantage of supplying, at the same time or active oxygen, some of the alkalinity necessary for the reaction.

It was found to be possible to eliminate the nitriles from waste waters by using the oxidising power of derivatives of mineral or organic peroxy acid type and their salts, for example, the dipersulphates of ammonium, potassium and sodium, as well as monopersulphuric acid in solution, known commercially by the name of Caro acid, and its salt, potassium monopersulphate.

It was also established that the organic peroxy acids or their salts can be used in the pure state or in the form of solutions or dilutions, or even advantageously replaced by an association of reactants capable of generating the peroxy acid. Hydrogen peroxide, the mineral or organic hydroperoxydates such as the alkali metal perborates or percarbonates, the perpyrophosphates, urea peroxide, and also the alkali metal and alkaline earth mineral peroxides admixed with an organic derivative which is a member of the group formed by the anhydrides, acid chlorides, aldehydes, esters and the acyclic N-compounds, form associations which can be considered in the process according to the invention.

It was also discovered that, in the presence of active oxygen, the destruction of the nitriles is not effected stoichiometrically by changing to the amide state.

It was also found that the speed of the reaction in detoxicating waste waters containing nitriles depends on the excess of active oxygen, the alkalinity and the temperature.

Hence, in the case of hydrogen peroxide and for an effluent charged with 50 p.p.m. of acrylonitrile, and at ambient temperature, a complete detoxication is obtained in 3½ hours in alkali medium containing 5 g./l. of NaOH, with an $H_2O_2$/RCN ratio of 3. The same result is obtained in one hour with an $H_2O_2$/RCN molar ratio of 10. An excess of the peroxide compound is favourable to the detoxication.

The peroxide compound is used in a molar ratio at least equal to peroxide compound/RCN=2, and preferably between 2 and 10.

The reaction for the destruction of the nitriles in the waste waters is accelerated by increasing the concentration of alkali. With the same effluent as before, and under the same conditions as regards temperature and $H_2O_2$/RCN molar ratio in alkali medium containing 0.5 g./l. of NaOH, a complete detoxication is obtained in seven hours. The advantage of adding the alkali is also shown by a comparison test treated only with 5 g./l. of alkali, which still contains half of the initial polluting agent after a contact time of 5 hours. After the same time, the comparison test, treated with 0.5 g./l. of NaOH, still contains two-thirds of the polluting substance.

According to one method of carrying out the process according to the invention, the selected alkali medium is sodium hydroxide or any other alkali such as sodium carbonate which is sufficiently strong to obtain the transformation reaction into amide and the saponification of the said amide into organic acid salt which can be easily degraded biologically.

Even in the case where alkali perborates and percarbonates are used, it is sometimes advantageous to strengthen this alkalinity by a supplementary addition of alkali substratum, for example, sodium carbonate.

The alkali is added to the effluent in a quantity such that the duration of the detoxication reaction is short and in accordance with industrial and sanitary requirements. This quantity of alkali is at least 0.5 g. per litre of effluent in the case of sodium hydroxide, and preferably 5 g. to 10 g. per litre of effluent, so as to treat effluents with a pH between 9 and 13, preferably 10 to 12, by the peroxide compound.

The influence of the temperature is very favorable to increasing the reaction velocity. For example, in treating the same solution containing 50 p.p.m. of acrylonitrile at 25, 40, 60, 80, and 90° C. with 0.5 g./l. of NaOH and $H_2O_2$ in a ratio of $H_2O_2$/RCN=3, this effluent is completely detoxicated in 7 hours, 2 hours, 1 hour, 30 minutes and 15 minutes.

It was also found that hydrogen peroxide acts as a catalyst in accelerating the hydrolysis reaction of the amide formed by the first reaction. This observation is particularly applicable to the treatment of waters charged with acrylonitrile, for which there is probably to be envisaged a degradation of the nitrile into sodium salt of the corresponding acids by reactions which could be different from those indicated previously. In fact, an acrylonitrile solution treated with $H_2O_2$—($H_2O_2$/RCN=3, 60° C. in the presence of sodium hydroxide), no longer contains acrylonitrile after 30 minutes and only 50% of the corresponding amide remain; the latter has completely disappeared after 6 hours.

These original observations are verified by experiments similar to those hereinafter described.

The hydrogen peroxide can be caused to act on an acrylamide solution of molar concentration equivalent to that obtained in the treatment described above, the hydrogen peroxide being introduced in a quantity corresponding to that which remains after the first reaction; that is to say, on the initial 3 moles of $H_2O_2$, 2 moles are consumed by $RCN$—$RCHNH_2$; 1 mole of $H_2O_2$ remains for acting on $RCONH_2$. It is established that the degradation of the amide is much slower than in the preceding case, since there still remain 85% after 30 minutes and 30% after 6 hours. These values are higher than those obtained in the above direct reaction of $H_2O_2$+RCN.

The accelerating action of the hydrogen peroxide can be further confirmed by the comparison test, in which the acrylamide is placed in alkali medium, under the conditions of the preceding test, but without adding hydrogen peroxide. The amide content only decreases by 5 to 8% per hour.

The raising of the temperature acts favourably on the reaction speed of the detoxication.

It was found that acrylonitriles are not the only compounds capable of being effectively treated by the process of the invention.

The oxodipropionitrile resulting from the addition of two molecules of acrylonitrile to one molecule of water can be treated under the same conditions. The results are as satisfactory as with acrylonitrile. The same also applies as regards propionitrile, acetonitrile, benzonitrile and other nitriles.

The presence of the acrylonitroile is determined by chromatography in vapour phase with detection by flame ionisation (1 metre column lined with a product known under the mark "Chromosorb," impregnated with 30% of product known under the mark "Carbowax 20 M"). This method can be used for all the volatile nitriles capable of being treated by the present process. It permits a minimum concentration of 0.2 to 0.3 p.p.m. to be detected.

The heavy nitriles are detected by thin film chromatography on a silica support, with elution by a chloroform-methanol mixture (95/5), and developing with Rhodamine B + iodine and examination with ultraviolet rays with a wavelength of $350\mu$.

The amides and the disappearance thereof are evaluated by simultaneous dosages of free ammonia in solution by the method using formaldehyde and ammonia, displaceable by boiling and distillation in the presence of a very large excess of strong alkali.

By applying the detoxication treatment of the present invention, a very oxygenated effluent is obtained, of which the nitriles are completely transformed into amides, which are themselves hydrolysed into non-toxic organic acid salts.

Examples which illustrate the invention in a non-limiting manner are giving below:

EXAMPLE 1

To 1 litre of aqueous solution of an effluent containing 50 p.p.m. of acrylonitrile are added 5 g. of sodium hydroxide and 0.25 ml. of 35% hydrogen peroxide, i.e. a molar ratio $H_2O_2/CH_2=CH-CN=3$.

For reaction temperatures which are respectively 25, 40, 60, 80 and 90° C. the disappearance of the acrylonitrile final content below 0.5 p.p.m., checked by vapour phase chromatography is obtained in: 3½ hours, 2 hours, 30 minutes, 20 minutes and 10 minutes.

EXAMPLE 2

The same solution as that described in Example 1 is treated under the same conditions, but with a quantity of sodium hydroxide reduced from 5 g. to 0.5 g. The complete detoxication is obtained for the same temperature range in 7 hours, 2 hours, 1 hour, 30 minutes and 15 minutes.

EXAMPLE 3

Using the conditions of Examples 1 and 2, industrial waste waters charged with 50 p.p.m. of acrylonitrile are treated, but the $H_2O_2$/RCN ratio is brought from 3 to 5. The reaction is twice as fast.

EXAMPLE 4

1 litre of an aqueous solution containing 1 g. of acrylonitrile and 5 g. of sodium hydroxide is treated with hydrogen peroxide in accordance with a molar ratio of $H_2O_2$/RCN=3, i.e. an excess of 50% with respect to the theoretical. At 60° C., the acrylonitrile has disappeared in 30 minutes. At this moment, already more than 50% of the amide corresponding to the introduced nitrile still remain and the amide has completely disappeared after 6 hours. A comparison test, under the same conditions, but without hydrogen peroxide, shows that the amide content after 6 hours is 60% of the value corresponding to the introduced nitrile.

EXAMPLE 5

To 1 litre of aqueous solution containing 2 g. per litre of oxodipropionitrile are added 0.5 g. of sodium hydroxide and 7 ml. of 35% hydrogen peroxide, i.e. an $H_2O_2$/RCN ratio of 2.6. The detoxication is complete in less than 30 minutes at 60° C.

EXAMPLE 6

1 litre of an industrial waste-water coming from a plant for the preparation of A. B. S. elastomer (acrylonitrile-butadiene-styrene) and containing 0.5 g. of acrylonitrile and 5 g. of oxodipropionitrile is treated with 22 ml. of 35% hydrogen peroxide at the temperature 60° C., i.e. an $H_2O_2$/RCN ratio=2.8. Complete detoxication is obtained in less than 30 minutes.

EXAMPLE 7

1 litre of an aqueous solution with 50 p.p.m. of acrylonitrile is treated with 1.5 g. of sodium perborate, i.e., a molar ratio of $$\frac{NaBO_2 \cdot H_2O_2 \cdot 3H_2O}{CH_2=CH-CN}=10$$

After a contact time of 2½ hours at 60° C., nitrile can no longer be detected.

EXAMPLE 8

A solution identical with that of Example 6 is treated with 0.31 g. of sodium percarbonate in accordance with a molar ratio $$\frac{(2Na_2CO_3 \cdot 3H_2O_2)}{CH_2=CH-CN}=1$$

The alkalinity of the medium is reinforced by a supplementary addition of 5 g. of $Na_2CO_3$. After 2 hours at 60° C., nitrile can no longer be detected. 10 p.p.m. thereof remained after 30 minutes.

EXAMPLE 9

To 1 litre of aqueous solution with 50 p.p.m. of acrylonitrile are added 5 g. of caustic soda and then 1.7 ml. of a solution with 200 g./l. of monopersulphuric acid, i.e. a ratio of $$\frac{H_2SO_5}{RCN}=3$$

After a contact time of 1½ hours at 60° C., nitriles can no longer be detected; 10 p.p.m. thereof remained after 20 minutes.

EXAMPLE 10

Under the conditions of Example 8, waste waters charged with 50 p.p.m. of acrylonitrile are treated with 2.3 g. of ammonium dipersulphate, i.e. a ratio of $$\frac{(NH_4)_2S_2O_8}{RCN}=10$$

After 2½ hours, nitriles can no longer be detected. 10 p.p.m. thereof remained after 45 minutes.

EXAMPLE 11

1 litre of an aqueous solution containing 50 p.p.m. of acetonitrile is treated with 1 ml. of 35% hydrogen peroxide in the presence of 5 g. of sodium hydroxide. The $H_2O_2$ RCN ratio is 10. After 4 hours at 60° C., nitrile can no longer be detected. 10 p.p.m. thereof remained after 2 hours.

EXAMPLE 12

A solution with 50 p.p.m. of propionitrile is treated under the conditions of Example 6. After a contact time of 5 hours, there no longer remained any nitrile capable of detection. After 2½ hours, 10 p.p.m. of nitrile remained.

EXAMPLE 13

A solution with 50 p.p.m. of benzonitrile is treated with 0.25 ml. of 35% $H_2O_2$, i.e. a molar ratio of $H_2O_2$/RCN=5. After a contact time of 4 hours at 60° C., nitrile can no longer be detected. 10 p.p.m. thereof remained after a contact time of 1½ hours.

What I claim is:

1. A process for detoxicating waste waters containing organic nitriles comprising:
adjusting the pH of said waste waters to a value of at least 9 and reacting said organic nitriles with a single reagent consisting essentially of a peroxide compound present in a peroxide compound to RCN ratio at least equal to 2 according to the reactions

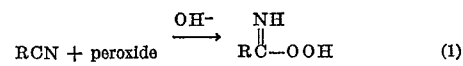

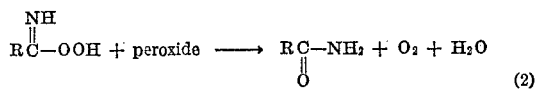

thus rapidly degrading said nitriles into amides and then into salts of organic acids.

2. A process for detoxicating waste waters according to claim 1, wherein the peroxide compound is used in a peroxide compound/RCN ratio between 2 and 10.

3. A process for detoxicating waste waters according to claim 1, wherein at least 0.5 g. of alkali agent is added per litre of effluent.

4. A process for detoxicating waste waters according to claim 1, wherein 5 g. to 10 g. per litre of alkali agent are added per litre of effluent.

5. A process for detoxicating waste waters according to claim 1, wherein the detoxication treatment is effected between 40 and 60° C.

6. A process for detoxicating waste waters according to claim 1, wherein the peroxide compound is hydrogen peroxide.

7. A process for detoxicating waste waters according to claim 3, wherein the peroxide compound and the alkali agent are introduced in the form of a member of the group consisting of alkali metal perborate and percarbonate.

8. Process for detoxicating waste waters according to claim 1, wherein the peroxide compound is a member of the group consisting of mineral and organic peroxy acids in the form of free acid and their salts.

9. A process for detoxicating waste waters according to claim 1, wherein the peroxide compound is a member of the group consisting of ammonium dipersulphate, sodium dipersulphate, monopersulphuric acid, and potassium monopersulphate.

10. A process for detoxicating waste waters according to claim 1, wherein the peroxide compound is introduced in the form of an association constituted by an active oxygen generator admixed with a member of the group consisting of anhydrides, acid chlorides, aldehydes, esters; the oxygen generator is a member of the group consisting of hydrogen peroxide, mineral and organic hydroperoxydates, alkali metal perborates and percarbonates, the perpyrophosphates, urea peroxide and the alkali and alkaline earth mineral peroxides.

11. A process for detoxicating waste waters according to claim 1, wherein the nitrile is a member of the group consisting of acrylonitrile, oxodipropionitrile, acetonitrile, benzonitrile, propionitrile and methacrylonitrile.

12. A process in accordance with claim 1 wherein said pH is in the range of 10 to 12.

13. A process in accordance with claim 1 carried out in less than 7 hours.

References Cited

UNITED STATES PATENTS

| | | | |
|---|---|---|---|
| 3,617,567 | 11/1971 | Mathre | 210—50 |
| 3,617,582 | 11/1971 | Lawes et al. | 210—63 |
| 3,510,424 | 5/1970 | Zumbrunn | 210—63 |
| 2,576,442 | 11/1951 | Borglin et al. | 210—63 X |
| 3,386,951 | 6/1968 | Rutschi et al. | 210—62 |
| 3,586,623 | 6/1971 | Kuhn | 210—63 |
| 3,055,738 | 9/1962 | Krebaum | 260—465.9 X |

FOREIGN PATENTS

| | | | |
|---|---|---|---|
| 600,789 | 6/1960 | Canada | 210—63 |

OTHER REFERENCES

Gurnham, C. F.: Principles of Industrial Waste Treatment, 1955, John Wiley and Sons, New York, p. 220.

REUBEN FRIEDMAN, Primary Examiner

T. G. WYSE, Assistant Examiner